United States Patent [19]

György et al.

[11] Patent Number: 4,915,878
[45] Date of Patent: Apr. 10, 1990

[54] PACKING STRUCTURE ESPECIALLY FOR USE IN A COLUMN MAINLY FOR CONTACTING LIQUID AND GAS PHASES

[76] Inventors: Fábry György, Csalán u. 1, H-1025 Budapest; Manczinger Pál, Rügy u. 5, H-1026 Budapest, both of Hungary

[21] Appl. No.: 272,983
[22] PCT Filed: Mar. 24, 1987
[86] PCT No.: PCT/HU87/00017
§ 371 Date: Sep. 23, 1988
§ 102(e) Date: Sep. 23, 1988
[87] PCT Pub. No.: WO87/05827
PCT Pub. Date: Oct. 8, 1987

[30] Foreign Application Priority Data

Mar. 24, 1986 [HU] Hungary .................. 1219/86

[51] Int. Cl.$^4$ ............................................. B01F 3/04
[52] U.S. Cl. ................................ 261/112.2; 428/184
[58] Field of Search ................ 261/112.2; 428/183, 428/184

[56] References Cited

U.S. PATENT DOCUMENTS

| | | | |
|---|---|---|---|
| 2,940,168 | 6/1960 | Monroe | 261/94 |
| 3,227,429 | 1/1966 | Renzi | 261/112.1 |
| 3,415,502 | 12/1968 | Munters | 261/112 |
| 3,485,485 | 12/1969 | Faigle | 261/112.2 |
| 4,228,943 | 10/1980 | Tanabe et al. | 261/112.2 |
| 4,363,753 | 12/1982 | Bozon et al. | 502/439 |
| 4,455,339 | 6/1984 | Meier et al. | 261/112.2 |
| 4,548,766 | 10/1985 | Kinney, Jr. et al. | 261/112.2 |
| 4,623,454 | 11/1986 | Tauscher et al. | 261/112.2 |

FOREIGN PATENT DOCUMENTS

| | | |
|---|---|---|
| 206918 | 11/1983 | Cook Islands . |
| 145154 | 11/1980 | German Democratic Rep. . |
| 583584 | 1/1977 | Switzerland . |
| 642568 | 4/1984 | Switzerland . |
| 2035831 | 6/1980 | United Kingdom . |
| 2103953 | 3/1983 | United Kingdom . |

*Primary Examiner*—Tim Miles
*Attorney, Agent, or Firm*—Michael N. Meller

[57] ABSTRACT

The packing belongs to the orderly arranged type and comprises packing units with sheets attached to each other. Each sheet consists of periodically repetitive formations of folded plates (13, 14) and the shape of the formations can be defined by the form of the upper and lower intersection line (profile) of the plates with upper and lower planes defined by the repective sides (1, 10) of the sheets. This form is symmetrical and it is similar to the letter "W" and has uneven arms (3, 2 or 4, 5), and the intersection line of a formation with the first of these planes is congruent with the intersection of the same formation with the other plane but these intersection lines are laterally offset with respect to each other by a half period. Adjacent ones of the sheet are attached to each other in such a way that an apex (C) defined by a pair of shorter arms (3, 4) of a sheet abuts an apex defined by the longer arms of the adjacent sheets, and the adjacent sheets abut each other alternatively and periodically at one or the other of their sides. The so attached sheets define periodical passage channels communicating laterally with each other, each channel has continuously varying cross section along the height, however, every pair of the channels have uniform combined cross section at every height.

9 Claims, 5 Drawing Sheets

PACKING STRUCTURE ESPECIALLY FOR USE IN A COLUMN MAINLY FOR CONTACTING LIQUID AND GAS PHASES

FIELD OF THE INVENTION

The invention relates to a packing structure especially for use in a column mainly for contacting liquid and gas phases.

BACKGROUND OF THE INVENTION

In the chemical industry for carrying out chemical operations that require the contacting of different phases that meet mostly in a counterflow e.g. such as absorption, distillation, etc. columns are used which can comprise several stages of plates, random or stacked packings or regular tower packings.

The efficiency of a phase-contacting assembly can be characterized by a few number of operational parameters e.g. by the quantity of material that can be processed in a unity volume of column or by the pressure drop that relates to a theoretical stage, etc. Regularly arranged packing structures can generally process higher quantities of material per unity volume of column with smaller pressure loss per theoretical stage than other packing bodies or trays can. Owing to such properties orderly arranged packing structures are especially appropriate for use under vacuum.

In tray columns in which the contact of different phases takes place in a stagewise manner, the expansion of the interfacial area, which decisively influences the mass transfer, occurs mainly on account of the flow energy of the gas phase i.e. it is associated with a higher pressure drop. The gas overcomes the hydrostatic pressure of the liquid on the plates, penetrates therethrough and it raises a fraction of the liquid in the form of a foam or droplets in the space between the plates, and the material transfer takes place through the so obtained free liquid surface i.e. at the phase boundary surface. For avoiding direct liquid transport only a portion of the space between the plates can thus be utilised which is connected with the less effective utilization of the column.

In packed columns in which there is a continuous contact between the phases, the liquid is flowing down along the mantle surfaces of the packing bodies, while the gas phase flows up through the space between the bodies which space defines free cross sections of flow. This free cross section can vary from layer to layer and it varies sometimes even within a layer as well. The interfacial area is constituted primarily by the wetted surface of the bodies. A portion of the flow energy of the gas phase gets lost as a friction loss on the surface of the bodies and other parts of this energy get lost mainly due to shape resistance and to swirling losses in the zig-zag channels between the bodies having varying cross sections.

In case of wetted packing bodies a portion of the increased loss of flow energy of the gas phase is utilised to wet the surface of the packing more effectively, whereby an increased interfacial area is obtained. In the smaller gas flow channels the gas retains more liquid, while in the larger passage channels the liquid can flow down in narrow streams without forming a film. This results first in the forward mixing of parts of the liquid phase i.e. both the flow profile and concentration profile will differ from the ideal piston-like flow and on the other hand in excess pressure drop. The increase of the liquid volume being jammed in contracting channel sections results in further increase in pressure losses and might cause local flooding. If the random packing has an inappropriate structure, the free cross section of flow can be decreased to such extents in one or more horizontal planes of the column that might cause the formation of 'liquid plugs'.

The use of ordered or regular packing structures can overcome most of such drawbacks of randomly packed columns. Ordered packing structures consist of sheets or ribbons arranged regularly in a side by side relationship.

Ordered packing structures comprise passage channels which can be considered to represent the elementary units thereof. The passage channels are open both at their upper and lower ends. In a counterflow operation the liquid phase enters the passage channels from above, while the gas enters from below. The liquid flows down on the surface of the sheets defining the sides of the passage channels, while the gas flows up in the space defined between the channel walls. The passage channels can also be open at portions of their sides. An ordered assembly of the passage channels forms generally a packing unit. In a column an ordered packing comprises a number of packing units placed above each other (in which adjacent units can be angularly displaced relative to each other).

The side walls of different kinds of ordered packing units are made generally by arranging appropriate corrugated sheets beside each other that can be made by folding, pressing or by other ways from continuous or apertured sheets.

Owing to the uniform structure of the passage channels in ordered packing units the free cross section of flow is uniform in different horizontal layers as well as within the layers. This property decreases the liquid hold-up and the pressure losses and provides flow and concentration profiles which are close to the ideal piston-like profile.

In U.S. Pat. Nos. 3.415.502 and 2.940.168 packing structures are shown that comprise passage channels open at one side and which each other at their open sides being then in mutually opposing relationship and the axes of such channels close respective angles with each other as well as with the axis of the column. The liquid enters the passage channels in the form of droplets or of jet streams, then abuts the slanted walls of the channels and gets spread thereon and flows down in directions which are divergent within every pair of the passage channels. The gas (vapor) enters the passage channels from below and during its oblique upstream the flow of a channel meets through the open side of the channel with the oppositely inclined stream of the neigbouring channel that crosses the first channel, and at the meeting zones swirling occurs due to mutual friction of the streams. The oblique arrangement of the passage channels facilitate the maxing of the gas and liquid phases in radial direction, but the increased flow resistance due to zig-zag flow is connected with significant pressure losses.

The swirl-formation and the increased flow resistance result in excess pressure losses that cannot create excessive interfacial area.

In U.S. Pat. No. 3.227.429 an ordered packing structure is described which has passage channels extending parallel both to each other and to the axis of the column. These passage channels have closed vertical side walls.

In each layer the passage channels are offset relative to each other by a half period. Owing to such design the two phases entering and leaving the passage channels in counterflow will be united and separated in an alternating manner without the need of using any additional deflection means. This design has the drawback that the radial distribution is smaller than required and the downwardly flowing liquid phase cannot impinge a slanted wall that would facilitate its spreading, thus the liquid can flow through the passage channel in the form of drops or of a wider or narrower jet which flow is associated first with a smaller proportion of the effectively damped surface and second with the occurrence of unwanted forward mixing. The packing structure described in the Czechoslowakian patent 206.918 has similar properties.

OBJECT OF THE INVENTION

The object of the invention is to eliminate the above summarized drawbacks of ordered packing structures and more particularly to provide such a geometric design for the sheets and their mutual connections that define passage channels with reduced flow resistance and decreased tendency to vortex formation and in which the liquid phase cannot flow through without being effectively spread and which can properly mix the parallel flows by alternatively uniting and separating them, whereby material transfer can take place in a simple way requiring a reduced volume of column and a decreased amount of energy.

SUMMARY OF THE INVENTION

According to the invention a packing structure has been provided especially for use in a column mainly for contacting liquid and gas phases, which packing structure comprises sheets which are periodically folded and attached to each other, the sheets define regular and periodical passage channels and the channels are opening to respective parallel planes defined by the two sides of the sheets, and the improvement according to the invention lies in that each of the sheets is composed of periodically repetitive elements and each line of intersection of such elements with said planes has a shape similar to the letter "M" or "W" which is symmetrical and has uneven arms formed by straight or slightly curved line sections, and the intersection line of an element with one of said planes defined by a first side of the sheet is geometrically congruent with the intersection line of this element with the other one of said planes defined by a second side of the sheet and these two intersection lines are laterally offset by a half period relative to each other, and adjacent ones of the sheets are attached to each other in such a way that an apex defined by a pair of the shorter arms of a sheet abuts an apex defined by the longer arms of the adjacent sheet and the adjacent sheets are abutting each other alternatively and periodically at one or the other one of said sides.

The form of the passage channels defined by sheets made and attached to each other as described hereinabove varies with a continuous transition between the in- and outflowing planes, whereas the free cross section of flow remains unchanged at each height. The continuous changing of the form of the passage channels ensures a low flow resistance and provides an optimum flow deflection.

The passage channels are open towards the neighbouring passage channels at their sides in such a way that the opening is continuously decreases at one side and increases in the other side along the length (height), the resulting combined cross section of any two neighbouring channel remain, however, unchanged at every height. The joining and separation of the streams flowing in a common direction in neighbouring channels occurs with minimum swirling due to the continuously varying opening through which these channels communicate.

The passage channels have closed incoming and outgoing openings defined by the edges of slanted plates that prevent simple throughflow of downwardly streaming liquid in drops or jets without being properly spread.

The above defined assembly of sheets forms a packing unit. By arranging several packing units above each other an ordered column packing system is obtained. The direction of flow will not suffer a sudden change in direction when entering from one unit into the other one therefore the flow will be almost streamlined.

DESCRIPTION OF THE DRAWINGS

The invention will now be described in connection with preferable embodiments thereof, in which reference will be made to the accompanying drawings. In the drawing.

DETAILED DESCRIPTION OF THE PREFERABLE EMBODIMENTS

Figure 1:
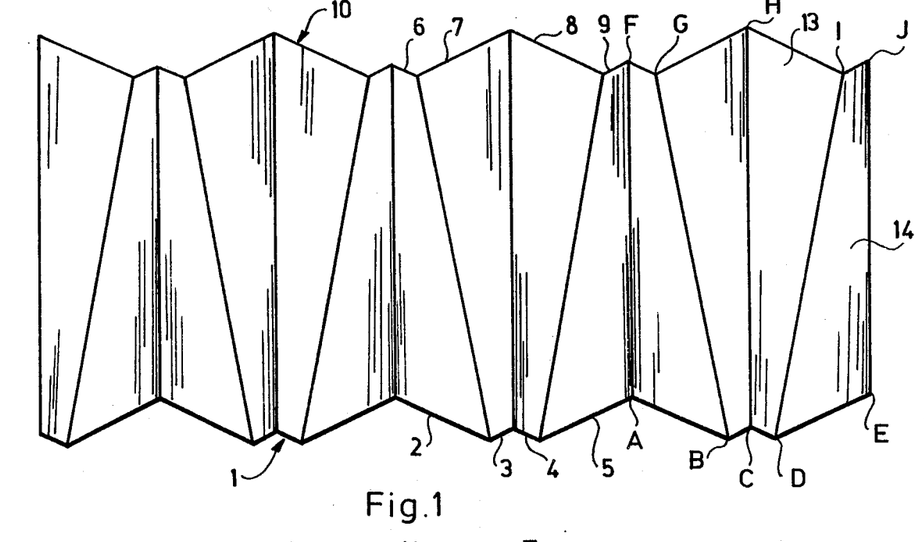
FIG. 1 shows a portion of a sheet forming the packing structure according to the invention.

FIG. 1 shows the perspective view of a portion of one of the sheets forming the packing according to the invention. The sheet can be made from a thin planar sheet by means of folding or pressing. The starting planar sheet itself can be slotted, grooved, apertured or woven preferable of metal or plastic wires. Lower side 1 of the sheet is formed by the repetitive plurality of formations composed of sections 2,3,4 and 5 similar to the letter "W" which fall in a common plane. In normal use this plane is preferably horizontal. Upper side 10 of the sheet is formed by the repetitive plurality of upper formations composed of sections 6,7,8 and 9 which upper formations are congruent to lower formations but they are laterally offset by a half period compared thereto. The upper formations also fall in a common plane which is parallel to the lower one.

Figure 2:
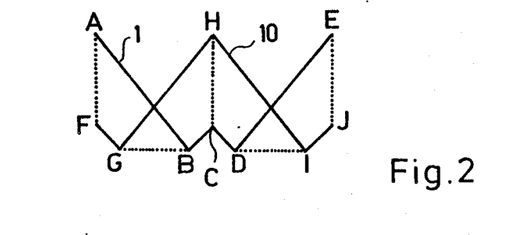
FIG. 2 shows the top view of the upper and lower sides of a periodic formation of a sheet.

FIG. 2 shows the top view of a period of respective formations of the lower and upper sides 1 and 10 projected together. The dotted lines indicate the folded edges of the sheet. For the case of clarity in FIG. 2 the mutual coverage of the sheet sections was not illustrated. It can be seen in FIG. 2 that the formations in the lower and upper sides 1 and 10 are not only congruent and offset by a half period but the spatial figure defined between them is an upright one in geometrical sense, i.e. point H of the upper side 10 is in alignment with points A and E of the lower side 1, and in a similar way points F,C and J as well as G,B,D and I are respectively aligned. Regarding the design of the sheets according to the invention the upright standing property is not always indispensable because alternative figures can be obtained if e.g. the lower side 1 is fixed and the upper side 10 is virtually moved laterally in its plane, whereby similar but oblique sheet figures are obtained. The main characteristics defining the form of the sheet do not change essentially if the proportion of the sections 6-7 and 2-3 is varied or alternatively if at a given value of this proportion the "W" formation is pulled wider or pressed narrower. This proportion should be preferably between 1:1.5 and 1:10, and the width of the formation depends also on the vertical height of the sheet.

Figure 3:
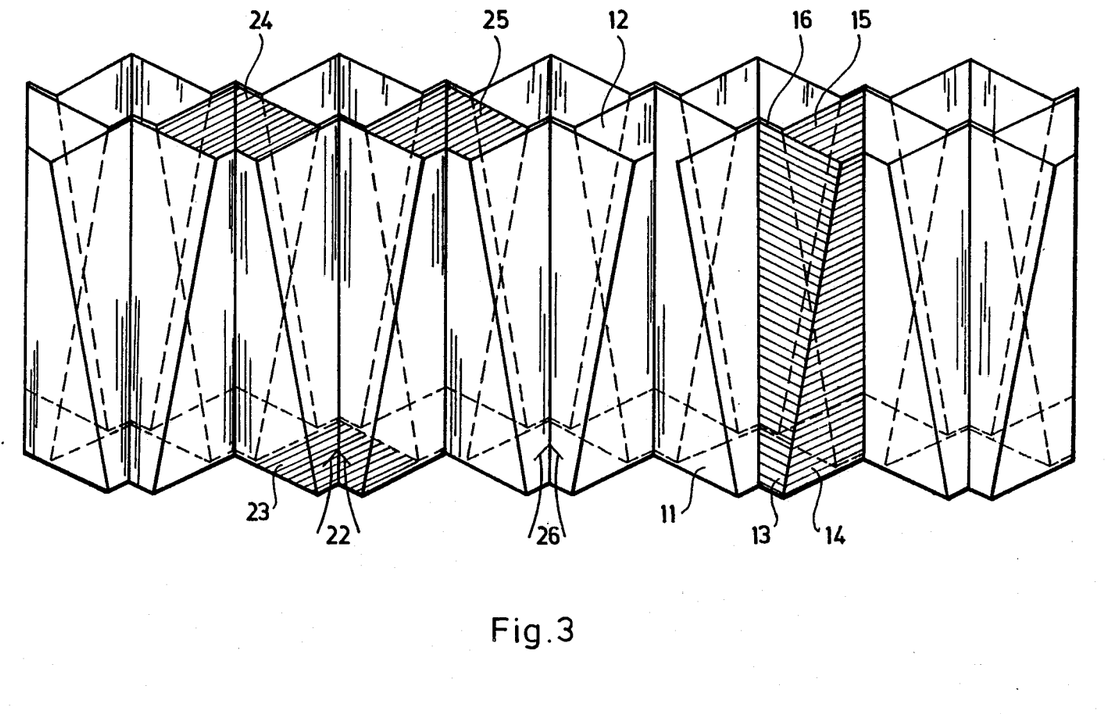
FIG. 3 shows the perspective view of a larger portion of the packing structure according to the invention.

FIG. 3 shows the perspective view of a portion of a packing according to the invention, which can be obtained by attaching a few number e.g. a pair of sheets 11,12 (such as shown in FIG. 1) together as shown. The attached sheets define passage channels therebetween which are almost vertical and have oblique walls. If the combined cross-section of all passage channels between the two sheets 11 and 12 is considered, one might draw the conclusion that this resulting cross-section is the same at every height.

Figure 4:
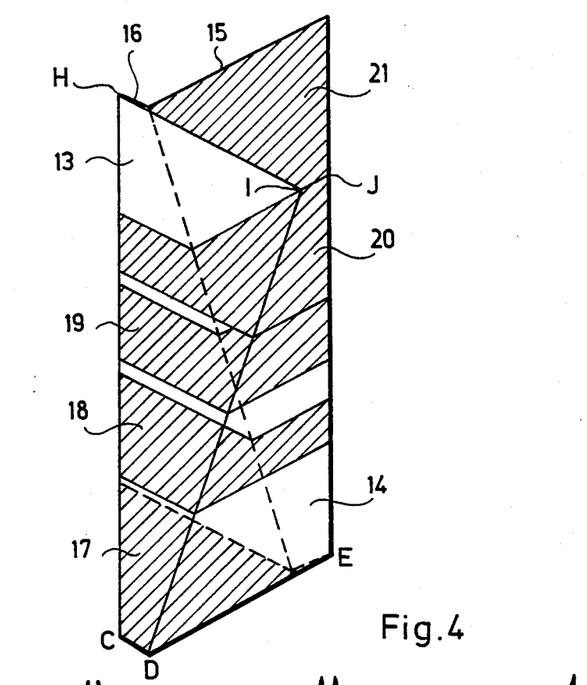
FIG. 4 shows the perspective view of an elementary unit of the periodic sheet structure.

This property will be illustrated in FIG. 4 which shows an elementary unit of the periodically repetitive structure of FIG. 3. The unit is composed of plates 13 and 14 of sheet 11 and plates 15 and 16 of sheet 12. For the sake of conformity with FIG. 1, the apices of the plates 13 and 14 have also been indicated in FIG. 4. In the lower plane defined by points C,D and E the cross-section of the elementary passage channel is shown by hatched area 17. In upward direction the plate 15 moves away from the plane of the plate 14, and the rear plate 16 approaches towards the plate 13. In the uppermost height the plate 16 abuts the plate 13, while the spacing between the plates 14 and 15 is at maximum. At different heights of the passage channel the respective cross-sections are indicated by hatched areas 18,19,20 and 21.

Figure 5:
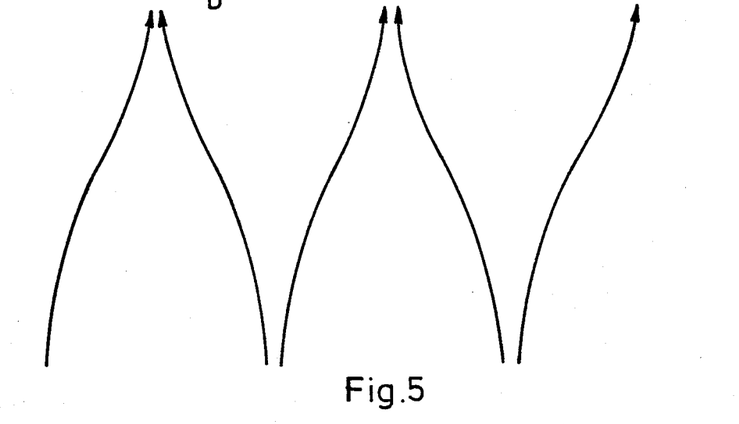
FIG. 5 shows schematically the flow of the upstreaming gas between two sheets.

Reference is made again to FIG. 3, in which arrow 22 shows the introduction of upstreaming gas into the lower end of a passage channel. The direction of upstreaming gas will be slightly diverted and the cross-section 23 which is closed in the plane of introduction gradually opens and it is continued in two cross-sections 24,25 which get closed again in the uppermost plane. One can understand, however, that not only the gas coming through the cross-section 23 will leave the cross-section 25 but also the half of the gas that enters in the adjacent passage channel indicated by arrow 26 will do so. FIG. 5 is a flow-chart for the upstreaming gas.

It can be appreciated that the passage channels formed between adjacent sheets of the packing according to the invention are continuously transformed into one-another, and owing to the uniform total cross-section at every height, as well as to the slight extent of changes in the streaming direction, the flow resistance will be very small and ram effects and unwanted vortex building will be much less compared to conventional designs. The constructional design provides for the uniform lateral distribution of the liquid phase that flows down on the walls of the sheet in the form of a thin fluid film.

Figure 6:
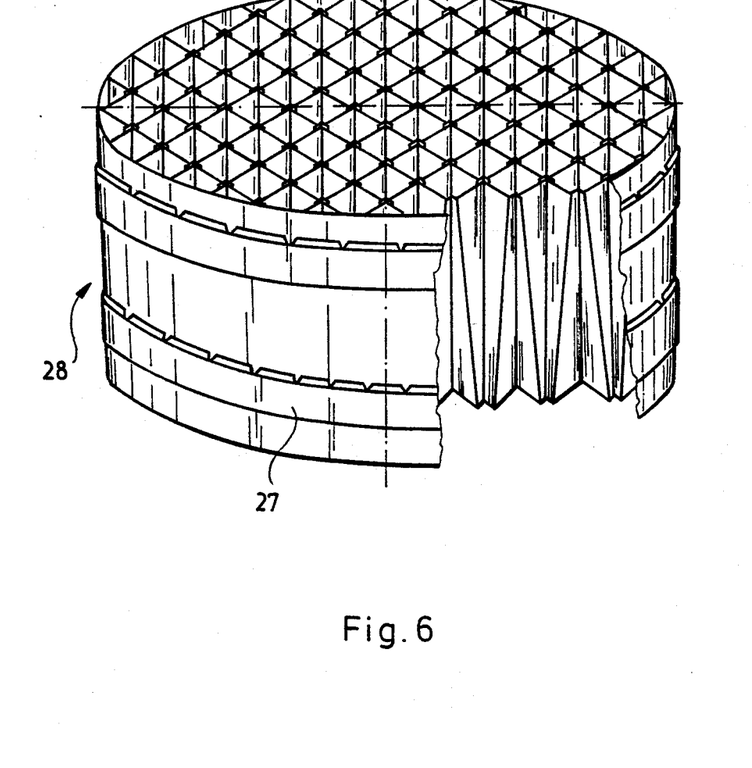
FIG. 6 shows the perspective view of a fraction of a packing unit partly in fraction.

FIG. 6 shows a unit of the packing according to the invention which comprises sheets designed and attached to each other as described hereinabove and their mutual position is fixed by means of retainer rings 27. The retainer ring 27 has a conventional design and enables the proper positioning of the packing units in the column.

Figure 7:
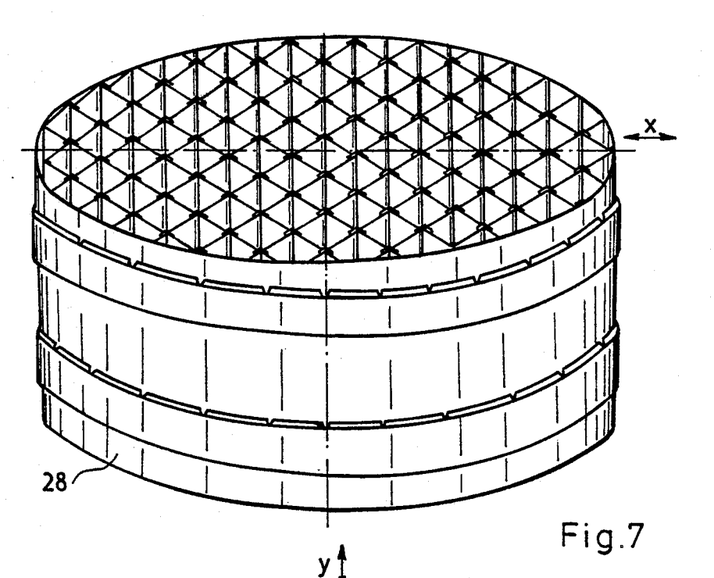
FIG. 7 is a view similar to FIG. 6 without fraction.
Figure 8:
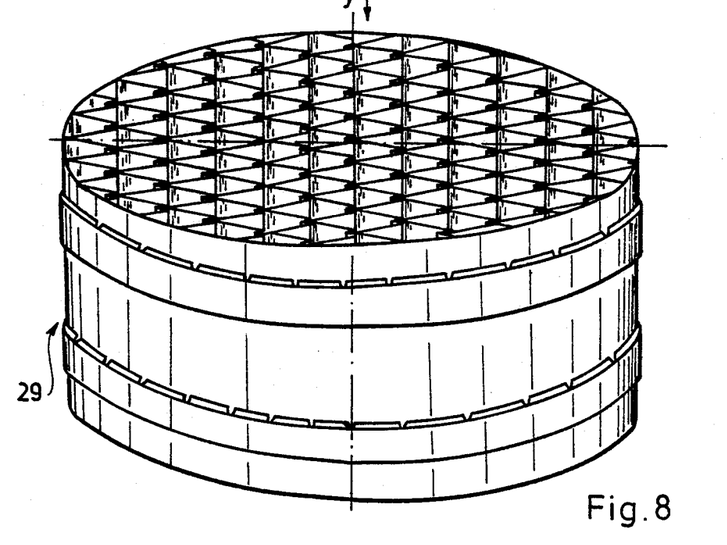
FIG. 8 shows an other packing unit with sheets being turned by 90° relative to the sheets of FIG. 7.

FIGS. 7 and 8 show packing units 28 and 29, respectively, designed as the one shown in FIG. 6. It can be seen that the sheets of the packing unit 28 extend horizontally in direction X of FIG. 7 and the sheets of the packing unit 29 therebelow extend normal thereto as indicated by arrow Y. If in a column packing units are arranged vertically on one another which have respective periodical passage channel systems that extend normal to each other, then the lateral distribution of both phases will thereby favorably be influenced, since the first unit distributes both streaming phases in the direction X and the other unit does the same in the direction Y. A column can be packed with several packing units, and a favorable distribution is obtained if the units are arranged in pairs with mutually perpendicular direction of sheets. It should be noted, however, that this normal arrangement of the units cannot form an indispensable condition, therefore units with parallel sheets or sheets that close angles other than 90° can also be used.

The favorable streaming and transition properties and low flow resistance of the packing according to the invention is illustrated by the data of Table 1. The data has been obtained by testing the operational parameters of the packing according to the invention in a test sytem of 4% NaOH as liquid phase and 1% $CO_2$ as a gas phase at carbonate conversion of 25%.

TABLE 1

| | |
|---|---|
| Specific geometrical surface (m2/m3) | 350 |
| Liquid load ($m^3/m^2h$) | 5 |
| Gas load (m/s) | 1 |
| Pressure drop (mbar/m) | .22 |
| Overall mass transfer coefficient ($kmol/m^3 hbar$) | 100 |
| Number of transfer units per length(l/m) | .67 |
| Pressure drop per transfer unit (mbar) | .33 |

Of the data given in Table 1 the highly favorable low pressure drop should be emphasised which renders the application of the packing according to the invention particularly useful for vacuum distillation purposes.

We claim:

1. Packing structure especially for use in a column mainly for contacting liquid and gas phases, said packing comprises sheets being periodically folded and attached to each other, said sheets define regular and periodical passage channels opening to respective parallel planes defined by sides of said sheets, characterized in that each of said sheets being composed of periodically repetitive elements, each line of intersection of said elements with said planes having a shape similar to the letter "M" or "W" which is symmetrical and having uneven arms formed by straight or slightly curved line sections, and the intersection line of an element with one of said planes defined by a first side (2) of said sheet being geometrically congruent with the intersection line of said element with the other one of said planes defined by a second side (1) of said sheet and said two intersection lines being laterally offset by a half period relative to each other, and adjacent ones of said sheets being attached to each other in such a way that an apex (C) defined by a pair of said shorter arms (3,4) of a sheet abutting an apex defined by said longer arms of said adjacent sheet and said adjacent sheets abutting each other alternatively and periodically at one or the other one of said sides.

2. The packing structure as claimed in claim 1, wherein said sheets having upright orientations.

3. The packing structure as claimed in claim 1, wherein said sheets being grooved, slotted, apertured or woven.

4. The packing structure as claimed in claim 1, wherein the ratio of the lengths of said shorter and longer arms (2,3 and 7,6) being between 1.5 and 15.

5. The packing structure as claimed in claim 4, wherein the height of said sheets defined by the distance of said planes being at least twice and at most ten times as long as the developed length of said "W" figure.

6. The packing structure as claimed in claim 1, wherein said sheets consist of planar surfaces.

7. The packing structure as claimed in claim 6, wherein said sheets having upright orientations.

8. The packing structure as claimed in claim 1, wherein said sheets being arranged to form a cylindrical or prismatic unit with mantle surface normal to said planes.

9. The packing structure as claimed in claim 8, wherein several ones of said units being arranged above each other in a column in which the sheets of neighbouring units close an angle, preferably a right angle with each other.

* * * * *

UNITED STATES PATENT AND TRADEMARK OFFICE
CERTIFICATE OF CORRECTION

PATENT NO. : 4,915,878

DATED : April 10, 1990

INVENTOR(S) : Fåbry Gyorgy et al

It is certified that error appears in the above-identified patent and that said Letters Patent is hereby corrected as shown below:

ON TITLE PAGE: Item [19]

"Gyorgy et al" should be --Fabry et al-- at line [76] both the Inventors names are reversed and should be printed:  Gyorgy FABRY
Pal MANCZINGER Signed and Sealed this Thirty-first Day of December, 1991

Attest:

HARRY F. MANBECK, JR.

Attesting Officer  Commissioner of Patents and Trademarks